(12) United States Patent  
Wiley et al.

(10) Patent No.: US 11,257,243 B2  
(45) Date of Patent: Feb. 22, 2022

(54) TARGET SHOOTING SYSTEM

(71) Applicant: Targetscope, Inc., Bear, DE (US)

(72) Inventors: Stephen Wiley, Bear, DE (US); Phillip Schweiger, Hockessin, DE (US); Sih-Ying Wu, Austin, TX (US)

( * ) Notice: Subject to any disclaimer, the term of this patent is extended or adjusted under 35 U.S.C. 154(b) by 321 days.

(21) Appl. No.: 16/557,681

(22) Filed: Aug. 30, 2019

(65) Prior Publication Data

US 2021/0065395 A1 Mar. 4, 2021

(51) Int. Cl.
| | |
|---|---|
| *G06T 7/70* | (2017.01) |
| *G06K 9/32* | (2006.01) |
| *G06T 7/11* | (2017.01) |
| *G06T 7/80* | (2017.01) |
| *G06T 7/90* | (2017.01) |
| *G06K 7/14* | (2006.01) |
| *G06K 9/62* | (2022.01) |

(52) U.S. Cl.
CPC .............. *G06T 7/70* (2017.01); *G06K 7/1413* (2013.01); *G06K 9/3233* (2013.01); *G06K 9/6215* (2013.01); *G06T 7/11* (2017.01); *G06T 7/80* (2017.01); *G06T 7/90* (2017.01); *G06T 2207/10024* (2013.01); *G06T 2207/30204* (2013.01)

(58) Field of Classification Search
CPC ............ G06T 7/70; G06T 7/80; G06K 7/1413
See application file for complete search history.

(56) References Cited

U.S. PATENT DOCUMENTS

| | | | |
|---|---|---|---|
| 10,943,367 B1* | 3/2021 | Robinson | B60W 50/00 |
| 2015/0347886 A1* | 12/2015 | Fang | G06K 19/06037 |
| | | | 235/462.04 |
| 2016/0298930 A1* | 10/2016 | Squire | F41G 3/26 |
| 2019/0063884 A1* | 2/2019 | McBride | F41J 5/14 |

* cited by examiner

*Primary Examiner* — Myron Wyche  
(74) *Attorney, Agent, or Firm* — Yee & Associates, P.C.

(57) ABSTRACT

A shot detection system can include a shooting target that is made of paper and printed to include fiducials, borders and a bar code together with a scoring region and markings. A method of camera adjustment control can find and lock onto a target. A target acquisition procedure can include extracting a region of interest (image of the shooting target), calibrating the region of interest and then target locking. The real-time target locking procedure can include correcting an image of the region of interest to account for tilt, rotation and skew. A methodology of shot detection can include acquiring probable and confirming shot candidates and then verifying the probably shot candidate with the confirming shot candidates to substantially eliminate falsely identified shots candidates, thereby significantly improving performance and experience.

18 Claims, 7 Drawing Sheets

TARGET SHOOTING SYSTEM

FIELD OF THE INVENTION

The present invention relates to target shooting and, in particular, to a target shooting shot detection system. The system provides a solution for automatic detection of shots using standard paper shooting targets in all typical shooting environments and at all typical shooting distances without the need for supplementary devices to assist with target identification or shot detection processes.

BACKGROUND OF THE INVENTION

Many target shooting systems exist to provide additional information to a target shooter. These systems attempt to provide the shooter with visual and statistical information about their shooting habits and performance. Specifically, shot detection systems have been created to help a target shooter identify where their shots are hitting the target. The way these target shooting systems work is widely variable. A problem with camera based shot detection systems has been that they are limited by their inability to work in all of the typical shooting environments and across variable shooting distances. Other problems with camera based shot detection systems have been that they require additional light sources or projectors, require user input for shot detection, or are limited to a narrow range of operating conditions.

U.S. Pat. No. 4,204,683 to Filippini, et al. discloses a closed video circuit for detecting shots on a target where the point of impact is determined by light influenced by a projectile prior to hitting the target.

U.S. Pat. No. 4,949,972 to Goodwin, et al. discloses a system for determining projectile location relative to a target. This system utilizes a target support structure with light emitting and receiving devices which generate output signals indicative of the location of the projectile during passage through the target area.

U.S. Pat. No. 5,577,733 to Downing discloses a targeting system which projects a light panel from a projector onto a target. A bullet from a gun passes through the light panel which sends signals indicative of the bullet's location and velocity to a computer which analyzes and displays the data.

U.S. Publication No. 2006/0150468 to Zhao discloses a video-monitor system to display the target image on screen.

Heretofore, the requirements of shot detection working in all of the typical shooting environments and across all of the typical variable shooting distances referred to above have not been fully met. Also, the shortcomings of requiring additional light sources or projectors, requiring user input for shot detection, or being limited to a narrow range of operating conditions referred to above have not been fully solved. In view of the foregoing, there is a need in the art for a solution that simultaneously addresses all of these requirements and problems.

SUMMARY OF INVENTION

Embodiments of this disclosure provide a solution for automatic detection of shots using standard paper shooting targets without the need for supplementary devices to assist with target identification or shot detection processes. Embodiments can include a digital camera with a motorized optical zoom lens, vision processing software (vison algorithm) on-board a computer processing unit connected to the camera, and shooting targets that are printed to optimize working with both the camera and its lens and the vision processing software. Embodiments can include printed paper shooting targets that are printed with fiducials, a border and other markings to optimize system performance and provide the system with information required to perform automatic system calibration, shot detection and shooting performance analysis. The vision processing software can compensate for target movement, change of distance and non-uniform lighting conditions.

Embodiments of this disclosure can include a target shooting system that includes a shooting target. The shooting target can be made of paper and printed to include a plurality of fiducials having centers that enable a machine vision system having a vison algorithm to correct for target movement, tilt, rotation and skew. The centers of the fiducials also enable the vision algorithm to define a virtual coordinate mesh to uniquely label detected shot candidates. The shooting target can include a border defining a shooting area. The target can include a machine readable identifier such as a barcode or other indicia to identify the target type and its associated shooting area markings for scoring purposes.

Other embodiments of this disclosure includes a methodology of camera adjustment control to find and lock onto a target. These embodiments can include target acquisition procedures based on extracting a region of interest (image of the shooting target), calibrating the region of interest. These embodiment can also include real-time target locking procedure that can include correcting an image of the region of interest to account for tilt, rotation, and skew.

Another embodiment of this disclosure includes a methodology of shot detection. The shot detection procedure can include acquiring probable shot candidates and confirming shot candidates and then verifying the probable shot candidate with the confirming shot candidates to substantially eliminate false positives, thereby significantly improving performance, accuracy and experience.

BRIEF DESCRIPTION OF THE DRAWINGS

In the detailed description of the preferred embodiments presented below, reference is made to the accompanying drawings.

DETAILED DESCRIPTION OF PREFERRED EMBODIMENTS

In the description that follows, like parts are marked throughout the specification and figures with the same numerals, respectively. The figures are not necessarily drawn to scale and may be shown in exaggerated or generalized form in the interest of clarity and conciseness.

Figure 1:
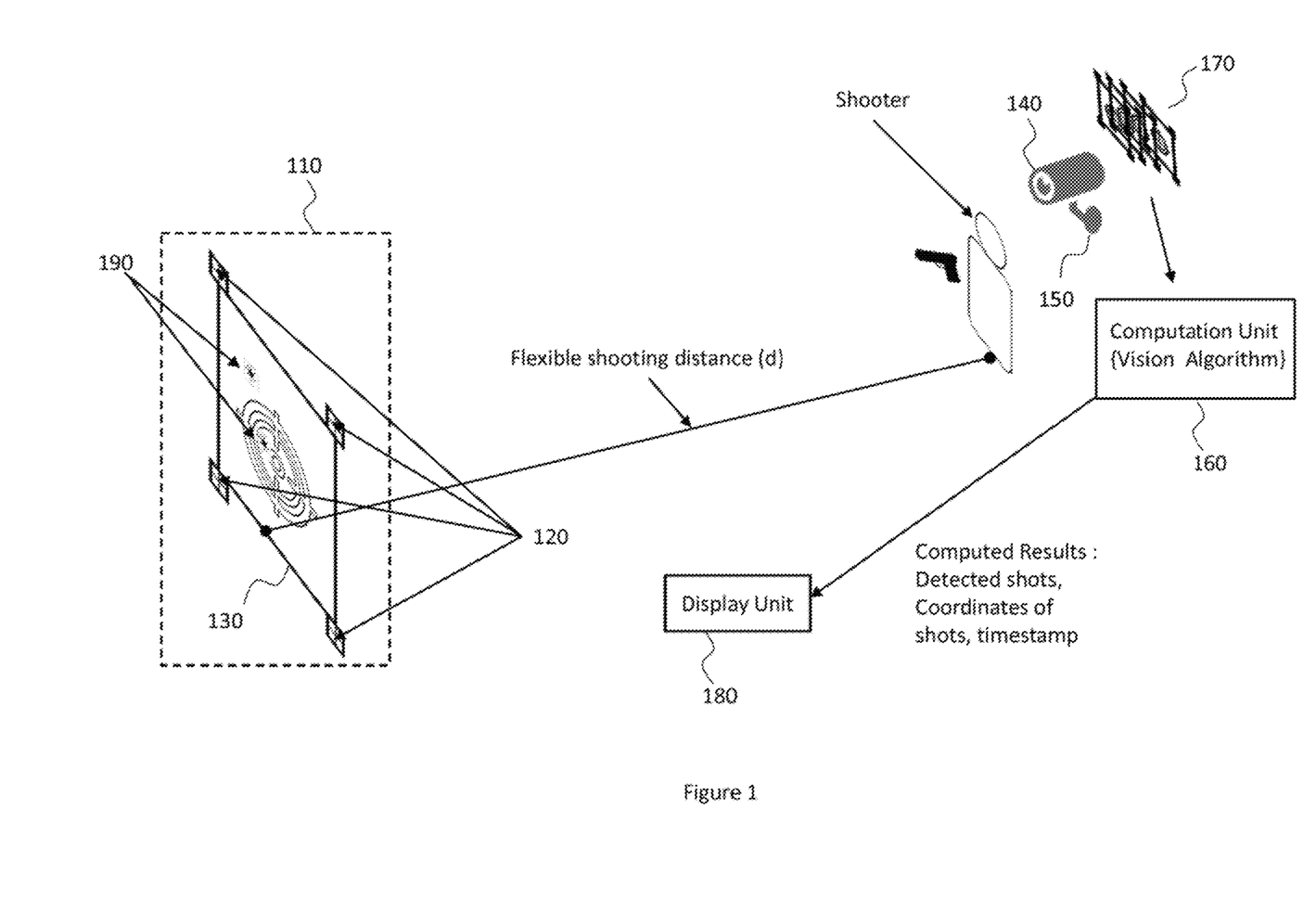
FIG. 1 is a perspective view of a shot detection system.

Referring to FIG. 1, a target shooting system can include target 110 with directional fiducials 120 and border 130 for tracking a position of the target. More generically, the target can be termed a shot detecting object. The target can be made of any suitable material such as plastic, foam core, wood, linen, etc., and the invention is not limited to paper targets. The target is viewed by camera 140 which can be encapsulated within protective enclosure 145 that can be mounted to adjustable swivel head 150 which can be fixed to a bar or stand positioned behind the line of fire. In alternative embodiments, the camera can be located at the line of fire, or even down range of the line of fire. The target is spaced a flexible shooting distance (d) from the line of fire behind which a shooter is located. The camera is coupled to, and interfaced with, computer 160 (computation unit) that can be positioned in close proximity to the camera. In alternative embodiments, the computer can be located elsewhere. A program (vison algorithm) executed by computer processes real time streaming frame data 170 (artist's conceptualization of a series of images) provided by the camera to find and lock the target and then determine the presence and virtual coordinate mesh locations of shots 190 that are on-target. In addition, the vison algorithm program can process other shooting performance metrics such as score (based on target design), timing of shots, which shots in a series (string) are on-target, trends in drift and/or rise during a series and group size. The information output by the program can be displayed on display unit 180 that can be positioned in close proximity to the computer. In alternative embodiments, the display can be located elsewhere. A program (user interface) executed by the computer processes data for the display, and other user interface devices which can be present such as a touch screen, a microphone, a speaker, headphones, a buzzer and/or lights. A program (middleware) executed by the computer processes data from and to the camera and its lens and other data acquisition devices which can be present such as lights, lasers, additional camera(s) and/or a microphone.

In a preferred embodiment, the display unit includes a touchscreen monitor and the shooter interfaces with the touchscreen monitor to control the target shooting system. The touchscreen monitor can be mounted to an adjustable arm (not shown) so that the monitor position can be adjusted by the shooter for optimal viewing of the monitor. In an alternative embodiment, the information output by the program can be displayed on a separate wireless device such as a cell phone or even a heads-up display located within glasses, goggles, a visor or a face shield. Shots 190 that are on-target leave holes (perforations, apertures) in the paper target can be detected by the camera and shown on the display unit in less than approximately 2.0 seconds, preferably less than approximately 1.0 second and, more preferably less than approximately 0.2 seconds.

The targets are designed with graphic features to enable the system to automatically find the target at a distance down range from the line of fire of from approximately 3 yards to more than approximately 500 yards. When the camera is provided with a suitable high magnification lens, the system can function at a range of more than 1,000 yards. After finding the target, the system can zoom into the target for optimal resolution, adjust other camera settings, lock onto the target and correct for target positioning to straighten the target relative to the camera, and remain locked throughout the shooting session for optimal performance even if the target moves (within camera view) due to environmental factors. Optionally, the camera can be connected to a motorized mounting to pivot (pan) the camera to increase the useable zoom range while keeping the target centered in the field of view of the camera or even to expand the effective field of view of the camera during target acquisition. The computer algorithm can directly control the camera's settings (such as, but not limited to, exposure gain, white balance, zoom, and focus) based on real time image analysis to achieve an optimum image for shot detection processing.

Figure 2:
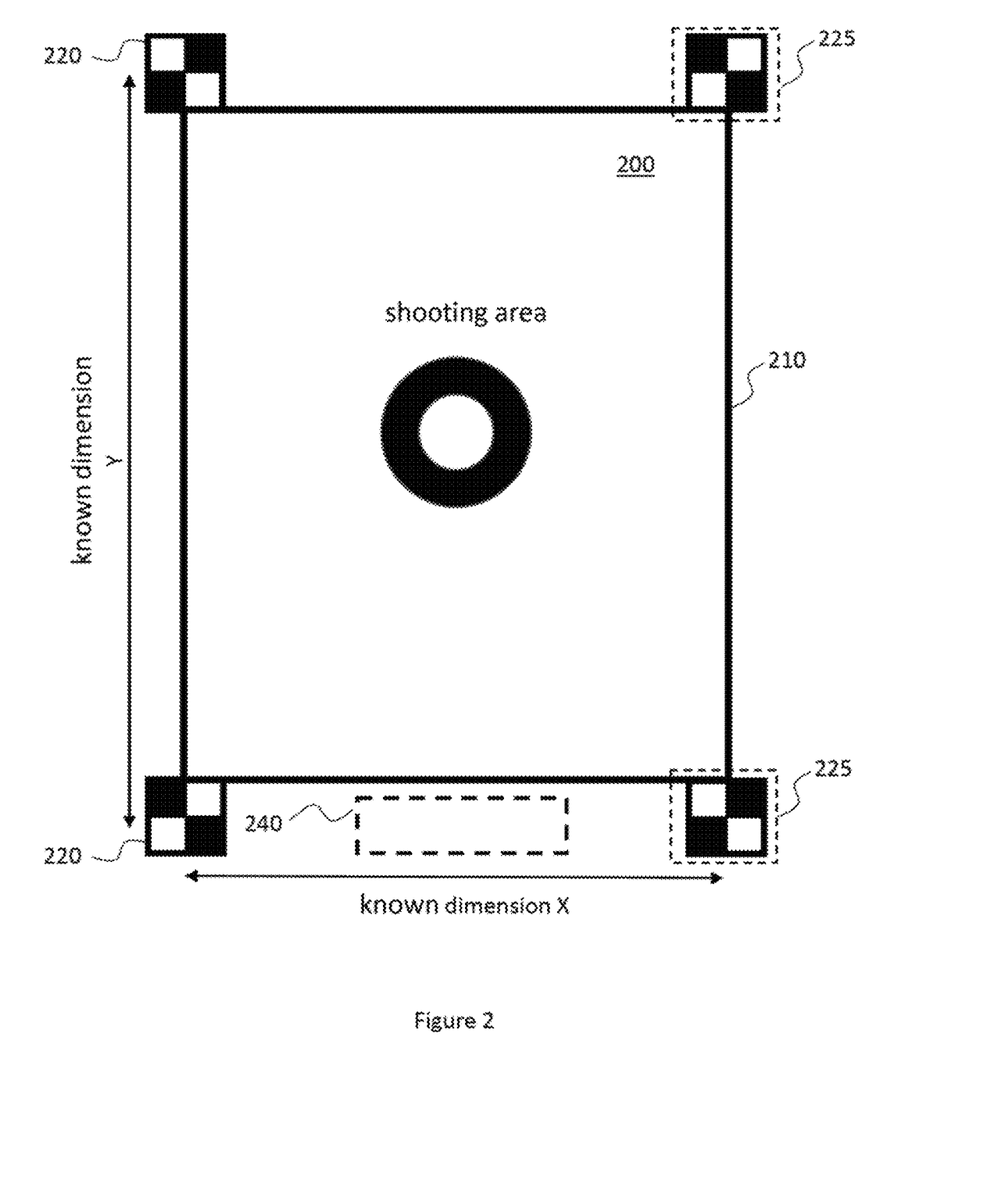
FIG. 2 is a portrait view of a paper target including a plurality of fiducials, a border and a barcode location.

Referring to FIG. 2, target 200 includes three primary features which enable the target shooting system functionalities described above. The three primary features of the target are target border 210 and directional fiducial markings 220, scoring region outlines and markings 230, and target barcode 240. The target border and fiducial markings are optimized in terms of color, size, shape, line thickness, and polarity. The target border facilitates real-time online target locking (tracking) and defines an on-target shooting area. The directional fiducials facilitate real-time online target acquisition and locking. The fiducial centers can define dimensions (x,y) that enable the computation unit to define/calibrate the algorithmic virtual coordinate mesh system in real time. The fiducials can be expanded to occupy larger fiducial area 225 to facilitate target acquisition at longer range and/or suboptimal lighting conditions. The color blue can be advantageously used to print the fiducials and border because the color blue has unexpectedly been found to facilitate operation of a digital camera in accord with embodiment of this disclosure for the purposes of target acquiring, extracting and tracking under shooting range environmental conditions such as lighting, target movement, vibration, smoke and humidity. The scoring region outlines and markings are optimized in terms of color, size, shape, and line thickness. These characteristics of the scoring region can be associated with a look-up table stored in the computation unit. The look-up table can be based on a target identifier such as, for example, a barcode. The barcode is optimized in terms of camera detection with regard to color, size, shape, line thickness, and barcode style. The barcode can be a 1D (1 dimensional) linear barcode or a 2D (2 dimensional) matrix barcode or other marking for identification of the target and look-up of characteristics such as the dimensions x, y and the shooting area markings for scoring purposes.

Referring to FIGS. 1-2, camera 140 can include a motorized zoom lens, an imaging sensor coupled to the lens, a camera control board coupled to the sensor, and a data transmission interface coupled to the board. The camera can be coupled to a protective enclosure that is coupled to an adjustable head that is coupled to a mounting bar or stand. These components enable the system to detect target 110, 200 at a position on the shooting range, optimize the camera settings for ideal system performance using software, and transmit the captured image data to the computer in a way that the computer can easily pass the data along to the program. The motorized zoom lens is selected to allow automated control over the zoom, focus, and aperture of the lens. The zoom lens enables maximum variation in target distance across both close and far distances under a wide variety of lighting conditions. The data transmission interface processes and transmits the image data using a protocol that the computer is able to interpret and pass along to the program with sufficient speed and minimal data size. The protective enclosure protects the image sensor, lens, control board, and data transmission interface from the range environment. The adjustable head allows for quick camera position adjustment and prevents unwanted camera movement. The bar or stand provides a base for the camera to mount to a wall, floor, or ceiling. Other embodiments of camera mounting can include a portable case or container that allows the camera to sit on the ground.

The computer can include a power supply to provide power to all system components, a cooling system to keep operating temperatures low, an enclosure to protect the computer components from the range environment, interface ports to connect to the camera and touchscreen monitor, a graphics card to output the information to be displayed on the monitor, storage space to save data, wi-fi connectivity to enable remote access to the system and cloud access for additional data storage, and a central processing unit which enables the maximum performance of the system with a minimal footprint.

The program which is executed by computer 160 is able to control the camera to optimize the camera settings to be able to find the target, zoom in to the target, optimize the image of the target, detect the markings of the target, create a virtual coordinate mesh of the target, detect the location of new shots on the target, and determine shooting performance metrics such as score, timing and group size based on the detected shots.

Display unit 180 can be a touch screen monitor and interfaces with the computer 160. The monitor displays data output from the program. The monitor can allow touchscreen control of the system. The monitor can be mounted to an adjustable arm to allow the shooter to physically position the monitor for ideal viewing of the display.

A plurality of target fiducials allow software to acquire a target and continuously lock-onto a target (and subsequently define an origin for a virtual coordinate mesh) in real-time even while the target is moving. The target fiducials allow for software correction of target tilt, rotation, and skew. The target fiducials also allow for software correction of folds and/or creases in the shooting target. A border defines a shooting area. A barcode identifies the type of target to associate target properties such as dimensions and shooting area markings. This enables embodiments of this disclosure to create a substantially perfect target image to analyze from an imperfect environment.

Referring to FIGS. 1 and 2, physical targets with fiducial marks can be recorded by the camera. Then the data from the camera can be processed by the computation unit. By utilizing these fiducial marks, the computer algorithm can capture and analyze optimum, correctable images from an imperfect environment.

In a shooting range environment, a target is subject to real-world conditions such as moving air (wind, ventilation draft, etc.) and changing lighting conditions (other shooting lanes becoming active or going dormant). As projectiles strike target 110, the target may move back and forth or side to side. As this occurs, the fiducial marks on the target assist the algorithm in understanding exactly where the target lies within the image captured by the camera. This means that as one image is compared to another for shot detection, the target does not have to be in the exact same physical location in order to achieve accurate detection of shots. This is an important and commercially significant advantage of embodiments of this disclosure.

One of the most significant advantages to using a system with known targets is that it allows for a clear definition of scoring regions. Since the fiducial marks and borders will provide a clearly defined origin and since the space within the shooting area is known (x and y), the system will always know definitively where a bullseye or other scoring region lies.

The fiducial marks and borders assist in rendering a corrected virtual coordinate mesh overlay on the target including its shooting area for scoring purposes. By using four defined corners, the algorithm can correct for imperfections in the target such as tilt, rotation, and skew (as well as folds and creases in the shooting target).

The system is designed to work at a close range (such as 3 yards) up to as far of a range as the camera lens is capable of magnifying to. The fiducial marks allow the distance between the target and the fixed camera to be variable. A target that is farther from the camera will appear smaller in the camera's field of view at a given zoom setting. The fiducial marks assist the computer algorithm in knowing the size of the target in the image frame and can therefore adjust shot detection tolerances based on the target size. This adjustment increases overall system reliability and significantly reduces false positive detection. The reduction of false positives is a major commercial advantage of embodiment of this disclosure.

While a user shoots at a target, the speed at which the shot detection feedback is presented to them is important for effective training. In order to detect every shot on-target quickly, the algorithm should process only the minimum amount of data that is needed. The fiducial marks allow the algorithm to know exactly where the shooting region is within the image and analyze only that data. Specific markings and coloring of the fiducials and borders allow the shooting region information to be extracted quickly and efficiently.

Other identifiers on the target may also be used to assist the algorithm in determining other required pieces of information such as target type, style, and revision. These identifiers may be in the form of a printed marking on the target or through another way of applying a marking to a target (such as a sticker).

One possible version of the aforementioned target with fiducial marks is a printed version on a physical piece of paper. Similar fiducials and border can also be printed on a physical piece of cardboard or other type of substrate. The fiducials and border can be ink, coatings, lamination or other materials to apply fiducial marks and identifiers. Embodiments of the invention can include a projection on a (semi-)reflective surface such as a replaceable screen based on a roll of paper and a take-up roll. Embodiments of the invention can include 3-D targets composed of foam where a surface of the foam is a first color (e.g. dark brown) and an interior of the foam is a second color (e.g. white) that contrasts with the first color. The fiducials and border can be affixed with adhesive or laminated to the surface of the foam. In the case of a 3-D target, a virtual coordinate mesh could be a virtual overlay virtually spaced apart from the compound curve surface of the target.

A fiducial marker or fiducial is an object placed in the field of view of an imaging system which appears in the image produced, for use as a point of reference or a measure. In accord with embodiments of this disclosure, a fiducial can be either something placed into or on the imaging subject, namely the shot detecting device (e.g. paper target). In preferred embodiments of the invention, the design of the fiducial is optimized to allow for both target acquisition and locking (tracking) as well as efficient use of the available target for a shooting area. Typically, this will result in the fiducials being located in the corners of a target. The shape of the target can be square, rectangular, round, polyhedral or other shape. While FIG. 2 shows a rectangular embodiment with checkerboard fiducials and solid borders connecting the four fiducials, the invention is not limited to checkerboard or another particular format of fiducial.

The checker board pattern fiducial is easy to detect with a pattern match algorithm. In a preferred embodiment, the vision algorithm uses corner detection to detect possible chessboard corners, together with phase detection to verify if a possible corner is a chessboard corner. The center of the fiducial can be precisely located using edge detection within the checkerboard pattern.

Preferably, each square in the checkerboard is either the color of the paper (e.g. cream white) or the color of the border (e.g. blue). This choice of colors is preferred because it facilitates rapid, accurate and precise operation of the machine vision algorithms. In a preferred embodiment, by varying the fill within the squares, each individual corner can be identified with a fiducial.

The colors of the fiducials are preferably white and blue. Since the paper of the target is typically a shade of white, the white squares of the fiducials can simply be left as unprinted areas of the paper. Since the blue squares of the fiducials are typically printed on the paper, the color of the blue can be usefully represented by printing industry standard CMYK color model values. Preferably, the blue squares can be printed areas characterized by CMYK color model values of C=approximately 100, M=from approximately 25 to approximately 100, Y=approximately 0, and K=0 to approximately 80. The borders of the target are preferably also blue printed areas with the same range of CMYK characteristics as the fiducials.

The choice of paper and ink can be important to optimizing performance of embodiments of the invention because the difference (delta) between a) the light reflected by the paper or ink and b) no light reflected by the paper or ink due to an aperture caused by a shot is the raw data for shot detection. Thus, embodiments of this disclosure do not require a light source located on the opposite side of the target from the camera lens.

The paper on which the fiducials and borders are printed will now be described. The paper size can advantageously be sized from approximately 30"×approximately 60" to approximately 8"×approximately 10"; preferable a standard size of approximately 24"×approximately 45" for target range familiarity. The paper weight bond can advantageously be from approximately 19 # to approximately 31 #, preferably approximately 20 # for economy.

Internationally, whiteness is the most commonly used measure as defined by the CIE (Commission Internationale de l'Eclairage—International Commission on Illumination) whereas in the US the most commonly seen measure is brightness as defined by the TAPPI (Technical Association of the Pulp and Paper Industry). Shade represents the color of the paper measured on the CIE LAB model (more formally known as CIE L*, a*, b*).

The CIE measure of whiteness is a measurement of the light reflected by the paper across the visible (daylight) spectrum. The CIE have set a standard of D65 illumination which is a standard representation of outdoor daylight under which the amount of light reflected is measured. For a perfect reflecting non-fluorescent white material, the CIE whiteness would be 100, however most commercially available 'white' paper has CIE whiteness measures of between 130 and 170 due to the addition of optical brightening agents (OBAs) which are designed to reflect light from the non-visible range (mainly ultra-violet) back in the visible spectrum. The lighting conditions under which the paper is viewed may well affect how a person sees the paper, paper that has a high whiteness achieved by adding large amounts of OBA to a fairly dull original sheet it may appear to be bright outside but less bright under indoor lighting conditions. On the other hand, a sheet with a good white base but low amounts of OBA will compare well under indoor lighting but may appear duller outdoors. This phenomenon is known as Metamerism. For indoor target use, it can be an advantage to use a paper with a good white base and lower amounts of OBA. Conversely, for outdoor target use it can be an advantage to use paper with higher amounts of OBA. For targets according to embodiments of the invention it can be an advantage to use paper with a CIE whiteness of from approximately 92 to approximately 99 because this gives less glare at lower cost and produces less strain on the eyes. This choice of whiteness can be preferred because less glare facilitates rapid, accurate and precise operation of the machine vision algorithms.

Brightness, as specified by the TAPPI is the measurement of the amount of reflectance of blue light (Wavelength 457 nanometers, 44 nm wide). There is also an ISO standard for measuring brightness (ISO 2469—Paper, board and pulps—Measurement of diffuse radiance factor) but this is rarely used as the CIE whiteness scale is the more common measurement. As with whiteness it is common to see brightness measurements of over 100, which means that more light is reflected than was originally shone on the paper due to Optical Brightening Agents reflecting part of the ultra-violet spectrum back in the visible spectrum. Measurement for TAPPI brightness are often in the 110-120 range, lower than commonly found CIE whiteness measures as the OBA's only have a small spectrum to reflect from the standard dictated blue light source. For targets according to embodiments of the invention it can be an advantage to use paper with a TAPPI brightness of from approximately 90 to approximately 98 because this gives less glare and produces less strain on the eyes. This range of brightness can be preferred because less glare facilitates rapid, accurate and precise operation of the machine vision algorithms.

A true white paper will reflect all the colors of the spectrum equally, whereas a blue white shade absorbs some of the longer wavelength red light and reflects more of the shorter wavelength blue light; conversely a cream white shade absorbs more blue light and reflects more of the red light. For targets according to embodiments of the invention it can be an advantage to use a more neutral, natural or cream white shade because this gives less glare and produces less strain on the eyes. This choice of shade can be preferred because less glare facilitates rapid, accurate and precise operation of the machine vision algorithms.

The paper used for the target can be a reactive splatter paper to improve shot detection in difficult low light conditions. Reactive splatter paper generates a contrasting corona when a shot is on-target.

The algorithms used for detection of the fiducials are robust to account for missing parts of the fiducials because they may be shot out. The robustness can be provided by computing a virtual fiducial that includes the missing parts based on the remaining parts of the fiducial that are sensed by the camera and recognized by the software. This can also include computing a complete virtual fiducial based on other fiducials that are sensed and recognized. The algorithms are also robust to account for missing parts of the border(s), barcode and/or shooting area markings because they may be shot out as well.

The border is specified to be an optimal width based on the size of the target in the image at the maximum distance. The width of the border is specified to be at least 10 pixels at this furthest distance. This contrast in color and the width of the border is used with an algorithm like a Hough transform to detect the presence of the border. The precise location is then determined by using an edge find algorithm.

The algorithms used are resilient to missing parts of the border that can be shot out. It is likely that a given target will eventually sustain physical damage during use, especially if the groups are small. When part of the border is missing, the algorithms can proceed based on extrapolating the missing portion of the border based on those portions of the border that are still intact and the fiducials.

The design of the target shooting area is optimized to include only colors and patterns which do not interfere with shot detection. For instance, white and green are optimal target colors for shot detection. Conversely, most shades of black, blue and/or gray can be advantageously avoided because they interfere with shot detection. The shooting area can include suitable markings such as a silhouette or bullseye (or other type of markings).

Camera adjustment/control to find and lock-onto a target can include software that uses camera controls such as: zoom, white balance, exposure gain, focus, shutter speed, aperture control, contrast and brightness. This software utilization of the camera controls can automatically find the target in the field of view and adjust settings to optimize shot detection. The target fiducials and borders are used along with the camera controls.

To successfully find the target in the cameras field of view and lock onto a target at a flexible shooting distance, the algorithm should automatically adjust camera settings to find the target and then further adjust camera settings to optimize the image in order to lock onto the target fiducials.

When the target acquisition procedure is initiated, the algorithm will load initial camera settings. Once the settings are loaded, an image is captured and the algorithm will attempt to extract the target from the image using the targets directional fiducials and target borders. If the target extraction process is not successful at finding the target, camera settings are adjusted and target extraction is re-attempted. If the target extraction process is successful, the algorithm will assign a confidence level to the camera settings which will be added to a cache of camera settings which result in the target being found.

The algorithm will continue to adjust camera settings and attempt to extract and find the target until camera settings adjustment results in the target not found. Once the algorithm encounters the target not found condition, it will evaluate the camera settings stored in the cache and load the set of camera settings with the highest confidence level at the closest zoom distance acquired.

After the coarse camera settings are loaded to the camera, the algorithm enters a "fine tuning mode" to optimize the camera settings for the real-time target locking procedure. The first step of the fine tuning process is to carry out a color balance check. If the color balance of the image is not optimal, the algorithm will recalibrate the color balance to produce an optimal image.

Once the optimal color balance is achieved, the algorithm will move onto the fine tune brightness step. If the color balance check returns that the color balance is already optimal, the algorithm will skip the recalibrate color step and move directly to the fine tune brightness step. The fine tune brightness step checks the brightness of the target image and using settings such as exposure gain, shutter speed and aperture adjustment to recalibrate the cameras brightness settings based on whether the target image is over or under exposed.

Once the optimal target brightness is achieved, the target location and optimized settings are saved so that the real-time target locking procedure can be carried out. The information in the target image will be extracted to find the Blue target fiducials and border. Once the target fiducials and borders are extracted, the algorithm will compute the locations of the fiducials. This process will be carried out over a series of captured images.

Figure 3A:
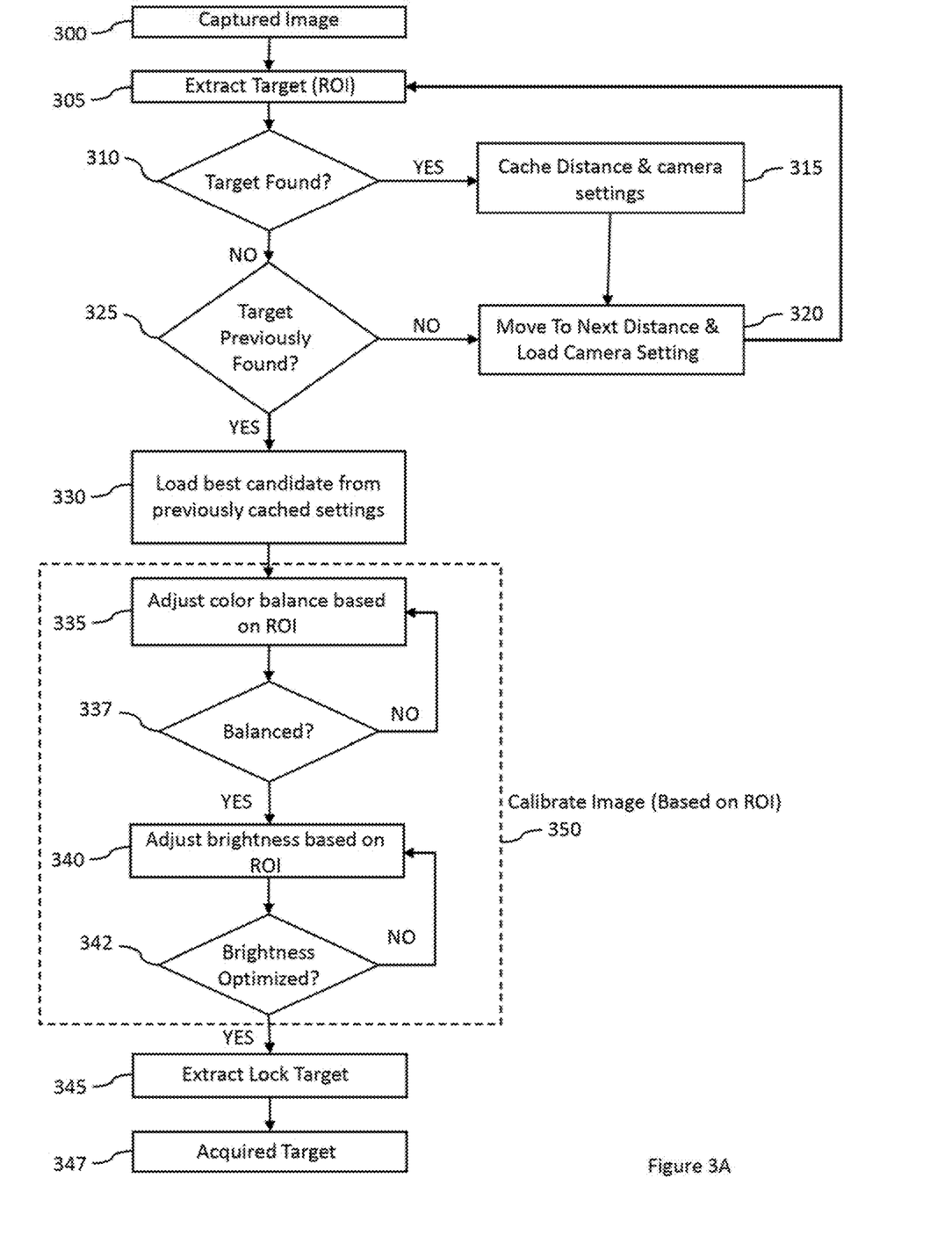
FIG. 3A is a flow diagram of a target acquisition process for use with a camera with preset zoom value steps that can be implemented by a computer program.

Referring to FIG. 3A, an example of a target acquisition procedure is illustrated. This target acquisition procedure embodiment is for when the distance between the target and camera may vary (e.g. 10 yards, 25 yards, etc.) and pre-calibrated camera settings are going to be used. In this embodiment, when moving toward each distance a vison algorithm does not perform "calibrate image", and it relies on settings loaded from a preconfigured file that have already been calibrated at each distance (offline calibration).

Still referring to FIG. 3A, this target acquisition procedure embodiment begins with captured image input 300. Extract target (ROI) process 305 is performed on the captured image. The extract target process can include recognizing a plurality of fiducials. The extract target process can include defining and extracting a region of interest for further analysis by cropping the region of interest or target from the image. Decision 310, if a target is found, then the procedure advances to a cache distance and camera settings process 315. The cache distance and camera settings can include saving a region of interest (ROI) that includes the shooting area of the target as well as camera settings such as lens zoom step, focus, aperture and the camera color balance and brightness. These camera settings are saved as settings that allow the vison algorithm to successfully extract the target from the image. The procedure then advances to a move to next distance and load camera settings process 320. The move to next distance and load camera setting process loads preset camera settings including the next zoom value step preset and adjust the camera settings according to the loaded presets. The move to next distance and load camera settings process can include adjusting the camera zoom, focus, color balance, brightness and even direction if the camera is mounted on an actuatable motor driven swivel head.

Alternatively, at decision 310, if no target is found, then the procedure advances to decision 325. At decision 325, if a target has not previously been found resulting in a cache of camera settings, then the procedure goes to the move to next distance and load camera settings process 320 and then back to captured image input 300. Alternatively, at decision 325 if a target has been previously found, then the procedure advances to load best candidate from previously cached settings output 330. From the previous presets cached at cache distance and camera settings process 315, the load best candidate from previously cached settings process 330 can use the preset with a shortest distance to target (highest zoom value) and load those camera settings. This comparison and choice of the best candidate is an important feature and commercial advantage of embodiments of this disclosure because this output/input selects the cached settings that are most likely to result in an optimized result after fine-tuning. The target acquisition procedure then proceeds to a calibrate image based on region of interest subroutine 350. This calibration of the image coming after load best candidate from previously cached settings process 330 is based on the region of interest. The calibration can include the vision algorithm iteratively tuning camera settings for color balance and brightness. Feedback for each iterative step can be calculated within the region of interest.

Still referring to FIG. 3A, at the calibrate image based on region of interest subroutine 350, an adjust color balance based on region of interest process 335 is implemented. This is a finetune of the color balance. This can include a step of recompute camera color balance setting based on a region of interest (target area) and adjust setting such that RGB color channel to achieve correct white balance inside the region of interest. A preferred "correct" white balance in this scenario is when R=G=B (red intensity=green intensity=blue intensity). It should be noted that this balance is specifically achieved on the white portion of the target and not on the entire target. At decision 337, a determination is made of whether the color is balanced based on one or more criterion. If no, then the procedure loops back to the adjust color balance based on adjust color balance based on region of interest process 335. Alternatively, at decision 337 if the color balance is acceptable based on the one or more criterion, then the procedure advances to adjust brightness based on region of interest process 340.

Still referring to FIG. 3A, at adjust brightness based on region of interest process 340, a brightness adjustment of the region of interest is begun. This is a fine tune of the brightness. This can include a step of recompute camera brightness setting based on the region of interest and adjust the setting to achieve optimized brightness in the region of interest. At decision 342, a determination is made of whether the brightness is optimized based on one or more criterion. If no, then the procedure loops back to adjust brightness based on region of interest process 340 and then again to decision 342. Alternatively, at decision 342 if the brightness is acceptable based on the one or more criterion, then the procedure advances to extract and lock target process 345. At the extract and lock target process, the target can be cropped from the image (extract target). The process can also include computing the fiducial centers on the target and making sure the polarity and contrast of the extracted fiducial centers meet a set of criteria. Finally, the extracted and locked target is presented at acquired target output 347.

Figure 3B:
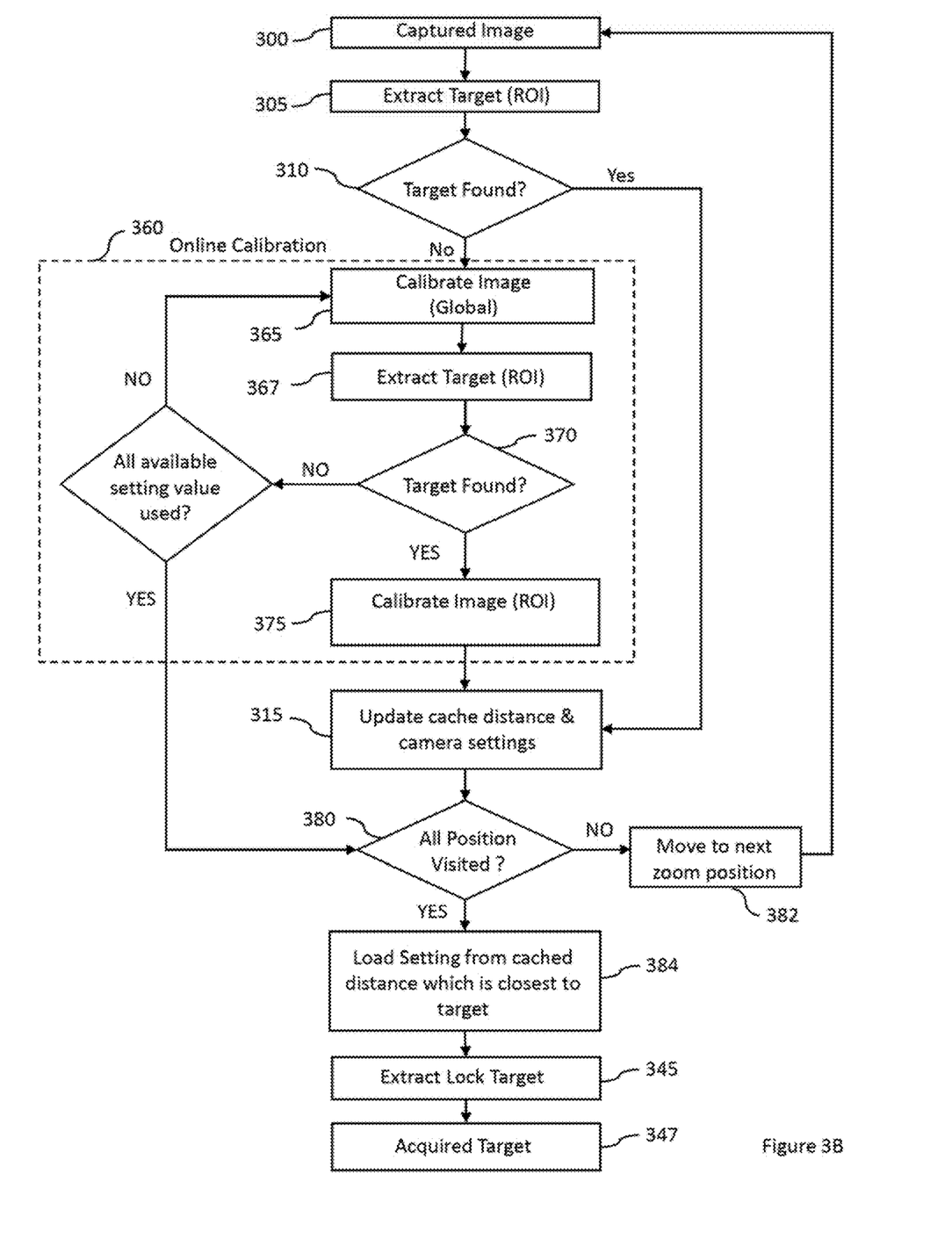
FIG. 3B is a flow diagram of a target acquisition process for use with a camera without preset zoom value steps that can be implemented by a computer program.

Referring to FIG. 3B, another example of a target acquisition procedure is illustrated. This target acquisition procedure embodiment is for when the distance between the target and camera may vary and pre-calibrated camera settings are not going to be used. In this embodiment, at each distance the vison algorithm calibrates an image at each distance if needed (e.g. when the target is not found) without relying of pre-calibrated settings; all camera settings are computed on-the-fly (online calibration). The embodiment shown in FIG. 3B does not utilize preset zoom value steps making the choice of distance between target and camera infinitely variable within a range (e.g. from approximately 3 yards to approximately 50 yards or more) with the tradeoff being more time may be required for acquisition without presets.

Still referring to FIG. 3B, this target acquisition procedure embodiment begins with captured image input 300. Extract target (ROI) process 305 is performed on the captured image. At decision 310, if a target is found, then the procedure advances to a cache distance and camera settings process 315. When at decision 310 a target is not found the procedure proceeds to online calibration subroutine 360. At online calibration subroutine 360, a calibrate image (global) process 365 is implemented. This is an online (while the shooter waits) (re)calibration of the entire image. The subroutine then proceeds to extract target (ROI) process 367 based on the (re)calibrated system. At target found decision 370 when the target is found the procedure proceeds to calibrate image (ROI) process 375. From calibrate image (ROI) process 375, the procedure proceeds to cache distance and camera setting process 315 and then advances to all positions visited decision 380.

Alternatively, at target found decision 370 if no target is found then the procedure proceeds to all available setting value used decision 377. If there are available setting values that have not been used, then the procedure returns to calibrate image (global) process 365. Alternatively, at all available setting value used decision 377, if all available setting values have been used, then the procedure exits online calibration subroutine 360 to all positions visited decision 380.

Still referring to FIG. 3B, at all positions visited decision 380, when all positions have not yet been visited, the procedure advances to move to next zoom position process 382. At move to next zoom position process 382, the lens of the camera is adjusted to the next zoom position and the procedure then returns to captured image input 300. Alternatively, at all positions visited decision 380, when all positions have been visited, then the procedure advances to load setting from cached distance which is closest to target 384. This procedure then advances to extract and lock target process 345 and then to acquired target output 347.

Figure 3C:
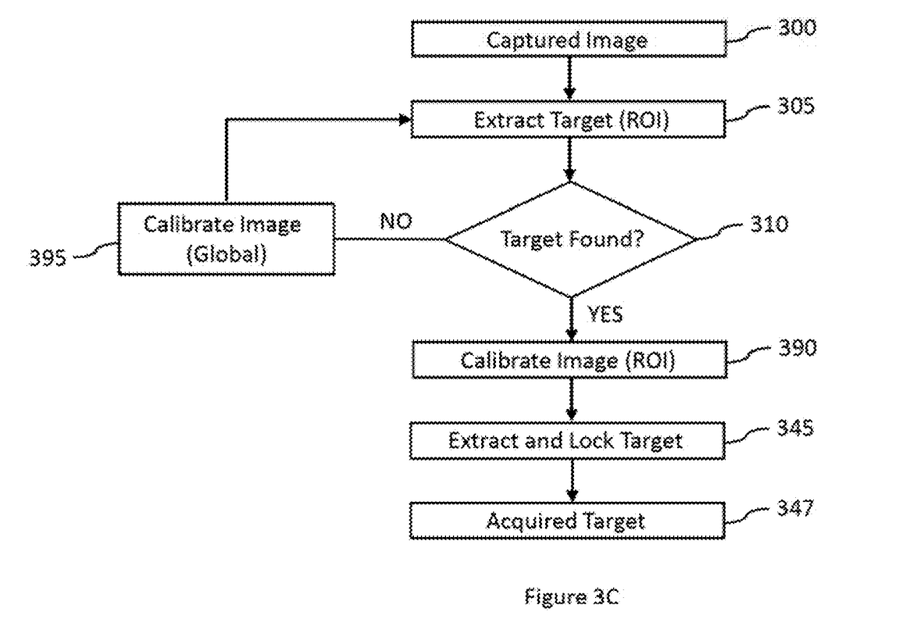
FIG. 3C is a flow diagram of a target acquisition process in a static camera and target situation that can be implemented by a computer program.

Referring to FIG. 3C, another example of a target acquisition procedure is illustrated. This target acquisition procedure embodiment is for when the distance between the target and camera is fixed and no zoom adjustment is required. For this procedure, the user does not have to input pre-defined camera settings or presets. The camera iterates through its setting until ideal camera parameters are found.

Still referring to FIG. 3C, this target acquisition procedure embodiment also begins with the captured image input 300. Again, extract target (ROI) process 305 is performed on the captured image. At decision 310, if a target is found, then the procedure advances to a calibrate image (ROI) process 390. This embodiment then advances to extract and lock target process 345 and then to acquired target output 347. Alternatively, at decision 310 if a target is not found then the procedure advances to a calibrate image (global) process 395. This is a (re)calibration of the entire image. From calibrate image (global) process 395, the procedure then returns to extract target (ROI) process 305.

Figure 4:
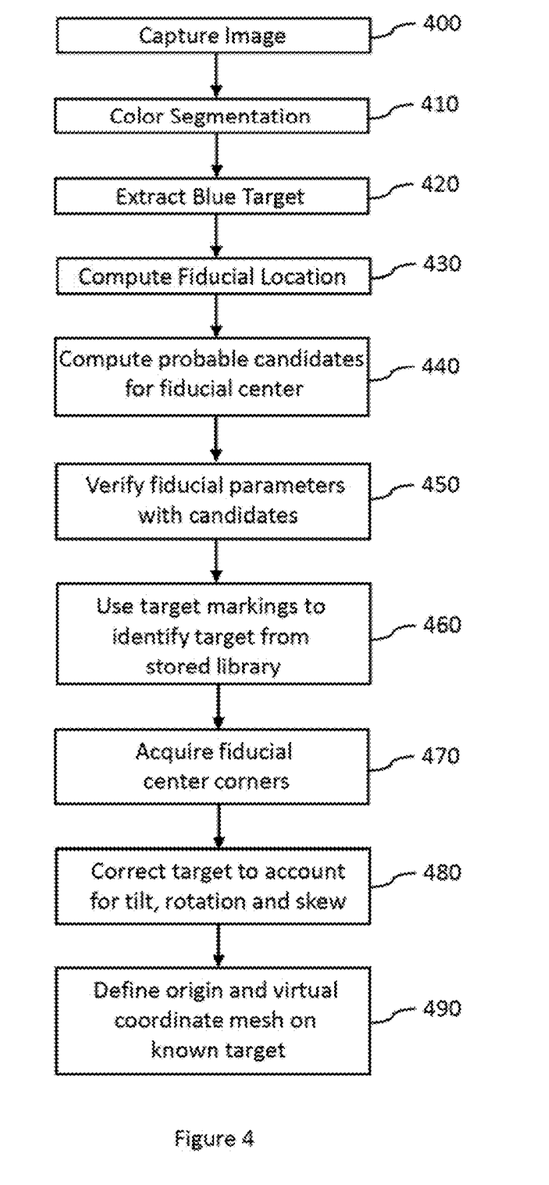
FIG. 4 is a flow diagram of a real-time target locking process that can be implemented by a computer program.

Referring to FIG. 4, an example of a real-time target locking (tracking) procedure is illustrated. This target locking procedure embodiment begins with captured image input 400. Captured image input 400 includes data from a camera. The captured image undergoes color segmentation process 410. Color segmentation process 410 uses a computed range of colors on a selected color model including a threshold of each color plane. This is followed by extract blue target process 420. The extract blue target process is implemented in a color segmented image and retrieves the target. The extracted blue target undergoes compute fiducial location process 430. The compute fiducial location process is based on known geometer configuration of the target. The compute fiducial location process computes regions of interest which contain fiducial locations (e.g. 4) roughly. The computed fiducial locations then undergo a compute probable candidates for fiducial center process 440. The compute probable candidates for fiducial center process includes searching within the computed regions of interest and computes possible corner candidate(s) for each of the fiducial centers. The probable candidates for fiducial centers are then confirmed by a verify fiducial parameters with candidates process 450. The verify fiducial parameters with candidates process includes, for each region of interest, checking each corner candidate to determine if it satisfies the following criteria to qualify as a fiducial center. First, it is determined if it satisfies a correct polarity criteria. Correct polarity criteria is intended to mean dark section(s) and light section(s) in expected locations (orientations) relative to one another. Second, it is determined if it satisfies a correct contrast criteria. Correct contrast criteria is intended to mean saturation (e.g. darkness) change(s) with respect to scalar displacement that match or at least approximate expected rate(s) of change for the fiducial corner feature(s) undergoing analysis.

Still referring to FIG. 4, a use target markings to identify target from stored library process 460 can be based on locations of candidates with verified fiducial parameters that match data is a stored library if different types of targets in the library have different fiducial locations and/or processing a region of interest that includes a barcode located on the target. Based on the verified fiducial centers and the known dimensions of the identified target, acquire fiducial center corners process 470 provides the center corners of the fiducials. The acquire fiducial center corners process includes, for each region of interest, selecting from among all qualified fiducial centers the candidate with a maximum score as the final fiducial center output for that particular region of interest. The maximum score can be determined by corner strength (completeness of expected feature(s)), and intensity contrast (contrast criteria) among multiple candidates if there are multiple candidates in a particular region of interest.

Still referring to FIG. 4, based on the acquired centers of the fiducials, the image of the target can be corrected to account for tilt, rotation, and skew using a correct target to account for tilt, rotation, and skew process 480. The correct target to account for tilt, rotation, and skew process can also correct for folds and creases in the shooting target. The correct target to account for tilt, rotation, and skew process includes using the fiducial centers (e.g. 4) to correct the image of the target such that the final target image looks straight, without tilt, rotation or skew. This is an important and commercially advantageous aspect of the invention because it enables a corrected portrait image of the target to be sent to the display device even if the tangible target is tilted, rotated and/or skewed. Finally, a define origin and virtual coordinate mesh on known target process 490 allows for subsequent operations with regard to both real-time images of the target and the virtual coordinate mesh. For instance, a Cartesian coordinate mesh overlay can be located with its origin at one of the fiducial centers. In an alternative embodiment, a spherical coordinate mesh overlay can be located with its origin at a center of a shooting area associated with the fiducials.

Shot detection can include redundancies and post-processing. A shooting environment is imperfect and features changing lighting conditions and targets that are not completely stationary. For instance, lights in nearby lanes can be turned on or off. Due to momentum, targets continue to move after the overhead trolley is stopped. Another source of undesired movement is shot impacts on the target or its associated holder. Another source of undesired movement is air from ventilation systems. The shot detection algorithm contains redundancies and post-processing features which help to eliminate false positives. Target fiducials are used to determine the exact position of the shot relative to the target origin. The shot is then checked in multiple frames to verify that it is truly a shot and not simply an artifact. Frame by frame comparison and discarding of unusable images creates reliable and robust shot detection. False positives are significantly reduced by checking to see if the target is tilted, if the imaged is blurred, or if the target is not fully locked (indicating that the target is moving).

The method for shot detection can include a seamless interaction between the camera, computation unit, and the physical target. When a frame is recorded by the camera, it is sent to the computation unit where the algorithm analyzes the image and attempts to match the image within a library of a known set of fiducial and border arrangements. Meanwhile, the algorithm can read target barcode 240 to identify the target format and compare the measured fiducial and border image data. When these are found, an appropriate region of interest can be defined and the image is compared to the previous image in an attempt to find new shots on-target associated with the appropriate region of interest. Before the image is compared, it is first optimized by the algorithm to ensure robustness and reliability. This optimization includes but is not limited to: correction for tilting, correction for blurring, correction for unknown artifacts in the image, and correction for imperfect target hanging such as rotation, tilt and skew.

In embodiments of this disclosure, shot detection works by extracting difference of two images. This comparison of images generates a delta that represents the difference (e.g. an aperture in a paper target). This requires the images to be registered to each other. This registration can be termed a virtual alignment. The fiducials and the border of the target are used to determine relative motion and registration between the frames.

If two consecutive frames are detected to have inconsistent registration, then the newest frame is considered a blurred frame and thus discarded. The next frame is checked instead. If the registration check passes then the target is deemed to be stable and the current frame is used for analysis. This method of detecting motion to avoid false positives is an important feature of embodiments of this disclosure and provides a significant commercial advantage.

When the frame is determined to be stable it is compared with the last frame that was stable to detect shots. If a shot is detected, the algorithm marks it as a candidate. The shot is confirmed when the difference between the original reference frame and a new frame is used to detect another candidate in the same location. The location of the shot should be within 5 pixels when using a Bayer pattern based camera. This process of avoiding falsely identified shot candidates is an important feature of embodiments of this disclosure and a significant commercial advantage because falsely detected shots are disruptive to a shooter experience.

Shot detection can be improved by using specific MPEG settings optimized for quality. In addition, averaging of frames can be used to improve the quality of the image.

Figure 5:
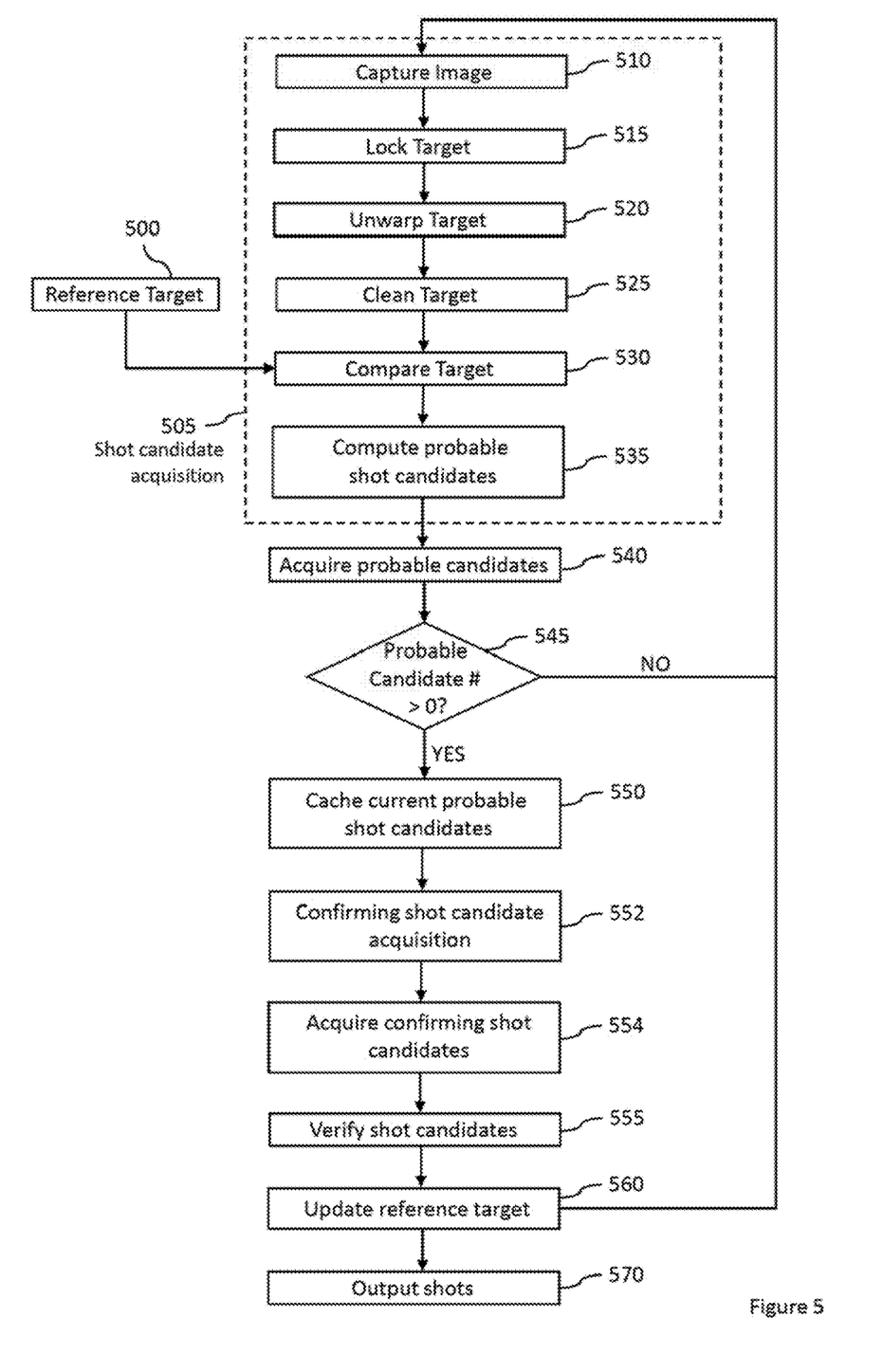
FIG. 5 is a flow diagram of a shot detection process that can be implemented by a computer program.

Referring to FIG. 5, an example of a shot detection procedure is illustrated. This shot detection procedure embodiment begins with reference target input 500. Reference target input 500 can be an acquired image from a camera for use as a baseline of target current status. The current status can include fiducial and border positions. Reference target input 500 can include displaying a reference target image on a monitor. In parallel, shot candidate acquisition subroutine 505 is implemented with capture image input 510 performed by a digital camera. The captured image is then processed by target lock process 515. The target lock process can include detecting the centers of the fiducials (e.g. 4 fiducials) and the border. The locked target undergoes unwarp target process 520. The unwrap target process can include virtually flattening a target to a planar form based on known distances between the fiducial centers. Unwarp target process 520 can include using the fiducials corners to straighten a target image to substantially eliminate tilt, rotation and skew. The unwrapped target undergoes clean target process 525 by removing artifact images that do not correspond to shots, shot candidates or known characteristics of the target. The clean target process can remove artifacts from the image such as shadows and noise. The cleaned target is compared to the reference target during compare target process 530. The comparison can include computing difference objects between the cleaned, straightened target and the reference target. Based on this comparison, compute probable shot candidates process 535 is performed. The compute probable shot candidate process 535 can include filtering out qualified shot candidates from unqualified difference objects.

Still referring to FIG. 5, probable shot candidates are then utilized in an acquire candidates 540 input. This acquire candidates is from among the probable shot candidates and can including filtering and removing candidates that are outside of (blue) border and/or removing candidates that are too close to existing shots to be considered distinguishable. At decision 545, if the number of high probability shot candidates is less than or equal to zero, then the procedure loops back to shot candidate acquisition subroutine 505. The shot detection procedure can be run continuously until timed out or otherwise shut down.

Alternatively, if at decision 545 the number of high probability shot candidates is greater than zero, then the procedure advances to cache current probable shot candidates output 550. These cached shot candidates are candidates that are to be verified by comparison to confirmed shot candidates.

Still referring to FIG. 5, the procedure then goes to confirming shot candidate acquisition subroutine 552 for a double check with a subsequent (e.g. next) frame to reduce false shots candidates. The next or subsequent frame provides fresh data on confirming shot candidates for verification purposes. The fresh data candidates can be termed confirming or new shot candidates. If a shot candidate is a true positive, it should be confirmed by the fresh data in the subsequent frame. Confirming shot candidate acquisition subroutine 552 can have the same process steps as shot candidate acquisition subroutine 505, but it is capturing a subsequent frame after decision 545 has already determined that there is present at least one probable shot candidate for verification. Optionally, the criterion in confirming shot candidate acquisition subroutine 552 can be more rigorous than the criterion in shot candidate acquisition subroutine 505.

Still referring to FIG. 5, confirming shot candidates are then utilized in an acquire confirming candidates input 554. The acquired confirming shot candidates from the subsequent frame then undergo a verify shot candidates between two shot candidates process 555 that can include comparing the confirming shot candidates from the subsequent frame to the probable shot candidates from the prerequisite frame. The result of verify shot candidates process 555 is that if a probable shot candidate to be verified can be properly associated with a corresponding confirming shot candidate with appropriate criteria, then record it as a valid shot, otherwise, discard it. Update reference target process 560 updates (revises) the reference target 500 data with verified shot data; and then splits the procedure to both output shots output 570 and looping back to shot candidate acquisition subroutine 505 to again begin collecting data for the next additional probable shot that is on-target.

The double check in confirming shot candidate acquisition subroutine 552 with the subsequent frame can include an escalated analysis where the comparison criterion are more rigorous and the probability threshold for a confirmed shot candidate is higher. Although the double check can be an escalated analysis, the invention is not limited to requiring more rigorous criterion during the double check and the double check can utilized the same criterion or even less rigorous criterion.

The double check is an important and commercial significant advantage of the invention because it improves a shooter's experience by reducing falsely identified shots. Embodiments of this disclosure can also include a third-check or even more checks. Although the embodiment of the invention shown in FIG. 5 includes the double check, the invention is not limited to requiring the double check and the double check can be omitted.

It is to be understood that the target shooting system and methods described herein may be implemented in various forms of hardware, software, firmware, special purpose processors, or a combination thereof. Preferably, the present invention is implemented in software as an application comprising program instructions that are tangibly embodied on a program storage device (e.g., magnetic floppy disk, RAM, CD ROM, ROM and Flash memory), and executable by any device or machine comprising suitable architecture. It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The CMYK color model is a subtractive color model, based on the CMY color model, used in color printing, and can also be used to describe the printing process itself. CMYK refers to the four inks used in some color printing: cyan, magenta, yellow and black. A target can be characterized according to this model based on obtaining information regarding the printing process used to produce the target.

The phrase virtual coordinate mesh is intended to mean a spatial indexing of a region of interest. The term fiducial is intended to mean a reference mark, point and/or line that can be detected by a vison algorithm and optionally used for comparison and/or correction. The phrase false positive is intended to mean a detected shot that is not actually a new shot but rather an incorrectly detected old shot or other artifact on the region of interest. A non-transitory computer readable media is intended to mean a physical structure that can store data that is computer or machine readable for more than a moment of time. Executable programing instructions are intended to mean computer and/or machine readable elements translatable for performing and/or implementing a method of this disclosure. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

The invention claimed is:

1. An apparatus, comprising a shot detection device including a target having: a first fiducial located on a surface of the target; a second fiducial located on the surface of the target; a third fiducial located on the surface of the target; wherein when the target is substantially planar i) the first fiducial is spaced apart from the second fiducial a first known distance and ii) the second fiducial is spaced apart from the third fiducial a second known distance; and, wherein the first fiducial, the second fiducial and the third fiducial allow a machine vision algorithm to i) continuously lock the target, ii) correct target tilt, rotation, and skew, and iii) define an origin for a virtual coordinate mesh in real-time even when the target is moving, further comprising: a fourth fiducial located on the surface of the target, the first fiducial, the second fiducial, the third fiducial and the fourth fiducial defining center corners; a border located on the surface of the target, the border defining a shooting area and facilitating tracking of the target, wherein the border is continuous and is adjacent the first fiducial, the second fiducial, the third fiducial and the fourth fiducial; and, a bar code located on the surface of the target and spaced apart from the shooting area, the bar code identifying the first known distance and the second known distance.

2. The apparatus of claim 1, further comprising a fourth fiducial located on the surface of the target, wherein the target includes paper.

3. The apparatus of claim 2, wherein the first fiducial, the second fiducial, the third fiducial and the fourth fiducial each include a blue printed area characterized by CMYK color model values of C=approximately 100, M=from approximately 25 to approximately 100, Y=approximately 0, and K=0 to approximately 80.

4. The apparatus of claim 3, further comprising a border located on the target, the border having a predetermined location relative to the first fiducial, the second fiducial, the third fiducial and the fourth fiducial and defining a shooting area.

5. The apparatus of claim 4, wherein the border is continuous and is adjacent the first fiducial, the second fiducial, the third fiducial and the fourth fiducial.

6. The apparatus of claim 5, wherein the border includes a blue printed area characterized by CMYK color model values of C=approximately 100, M=from approximately 25 to approximately 100, Y=approximately 0, and K=0 to approximately 80.

7. The apparatus of claim 6, further comprising a bar code located on the target and spaced apart from the shooting area, the bar code identifying the first known distance and the second known distance and identifying the shooting area.

8. A method, comprising camera adjustment control to find and lock a shooting target including: capturing an image using a digital camera having a lens; performing an extract region of interest process on the captured image wherein the region of interest corresponds to a portion of a surface of the target; determining whether the region of interest is successfully extracted; calibrating the region of interest when the region of interest is successfully extracted; extracting and locking the target; and, outputting an acquired target image, further comprising when a region of interest is extracted updating cached distance and camera settings, after the step of performing and before the steps of extracting and locking.

9. The method of claim 8, further comprising when a region of interest is not extracted calibrating the image after the step of performing and before the step of calibrating the region of interest, and then repeating the step of performing an extract region of interest process on the captured image.

10. A method, comprising camera adjustment control to find and lock a shooting target including: capturing an image using a digital camera having a lens; performing an extract region of interest process on the captured image wherein the region of interest corresponds to a portion of a surface of the target; determining whether the region of interest is successfully extracted; calibrating the region of interest when the region of interest is successfully extracted; extracting and locking the target; and, outputting an acquired target image, wherein extracting and locking the target includes segmenting the image by color and cropping portions of the image based on the color segmentation to extract a calibrated region of interest from the image.

11. A method, comprising camera adjustment control to find and lock a shooting target including: capturing an image using a digital camera having a lens; performing an extract region of interest process on the captured image wherein the region of interest corresponds to a portion of a surface of the target; determining whether the region of interest is successfully extracted; calibrating the region of interest when the region of interest is successfully extracted; extracting and locking the target; and, outputting an acquired target image, wherein extracting and locking the target includes computing a plurality of probable candidates for fiducial centers and verifying at least two of the plurality of probable candidates with predetermined fiducial parameters associated with a target version.

12. A method, comprising camera adjustment control to find and lock a shooting target including: capturing an image using a digital camera having a lens; performing an extract region of interest process on the captured image wherein the region of interest corresponds to a portion of a surface of the target; determining whether the region of interest is successfully extracted; calibrating the region of interest when the region of interest is successfully extracted; extracting and locking the target; and, outputting an acquired target image, wherein extracting and locking the target includes acquiring a plurality of fiducial center corners based on verified members of the plurality of probable candidates.

13. The method of claim 8, wherein extracting and locking the target includes correcting the calibrated region of interest to account for tilt, rotation and skew.

14. The method of claim 8, wherein extracting and locking the target includes defining an origin and a virtual coordinate mesh overlay on the calibrated region of interest.

15. A non-transitory computer readable media comprising executable programming instructions for performing the method of claim 8.

16. A method, comprising shot detection using a shooting target and a digital camera including: inputting an image of a reference target; acquiring shot candidates by: capturing, by the digital camera, an image of the shooting target; locking the image of the shooting target; unwrapping the image of the shooting target; cleaning the image of the shooting target; comparing the image of the shooting target to the image of the reference target; computing probable shot candidates using a set of probable shot criteria; acquiring probable shot candidates; determining whether a number of probable shot candidates is greater than zero; when a number of candidates is less than or equal to zero returning to the step of acquiring shot candidates, and, when the number of candidates is greater than zero caching current probable shot candidates, acquiring confirming shot candidates, acquiring probable confirming shot candidates, verifying probable shot candidates using probable confirming shot candidates, updating the reference target using the probable confirming shot candidates, outputting the probable confirming shot candidates, and returning to the step of acquiring a shot candidate.

17. The method of claim 16, wherein acquiring confirming shot candidates includes: capturing, by the digital camera, a confirming image of the shooting target; locking the confirming image of the shooting target; unwrapping the confirming image of the shooting target; cleaning the confirming image of the shooting target; comparing the confirming image of the shooting target to the image of the reference target; and, computing confirming shot candidates using a set of confirming shot criteria that are more rigorous than the set of probable shot criteria.

18. A non-transitory computer readable media comprising executable programming instructions for performing the method of claim 16.

* * * * *